Aug. 7, 1923.                                                   1,464,268
K. O. KELLER
ENGINE OPERATED BY LIQUID FUEL AND METHOD OF WORKING THE SAME
Filed March 2, 1922           2 Sheets-Sheet 1
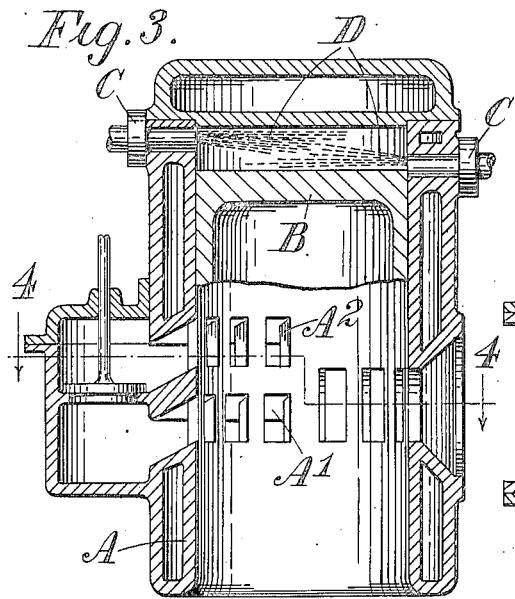
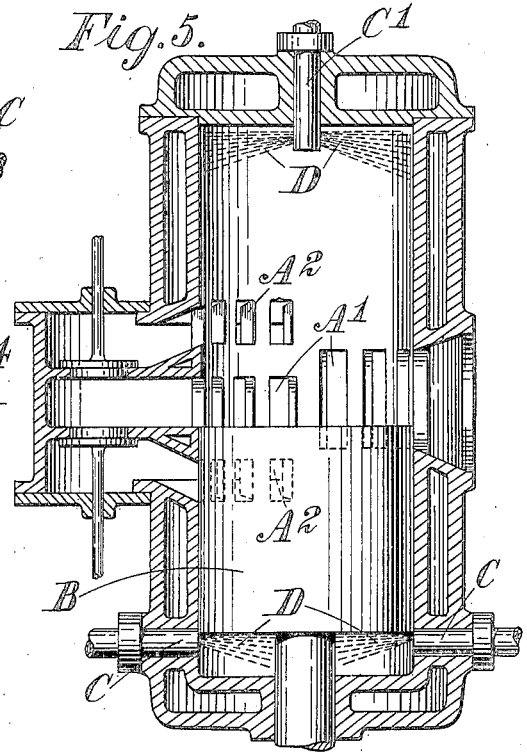
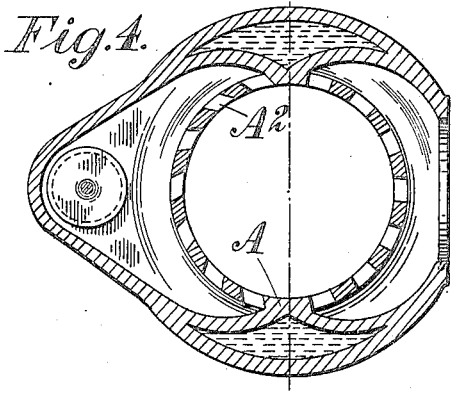
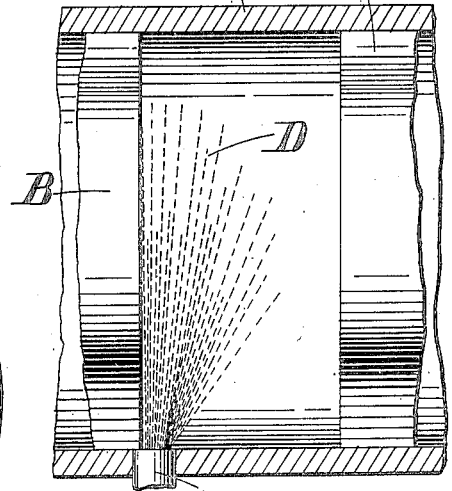
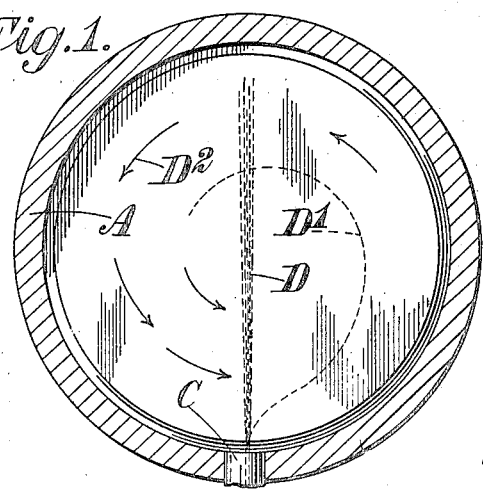
INVENTOR:
Karl O. Keller
by Byrnes, Stebbins, Burgess Parmelee
his Attorneys

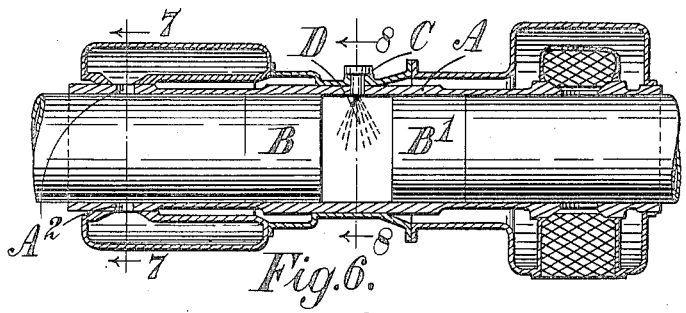 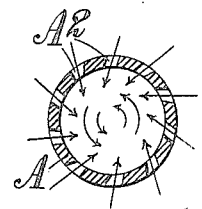
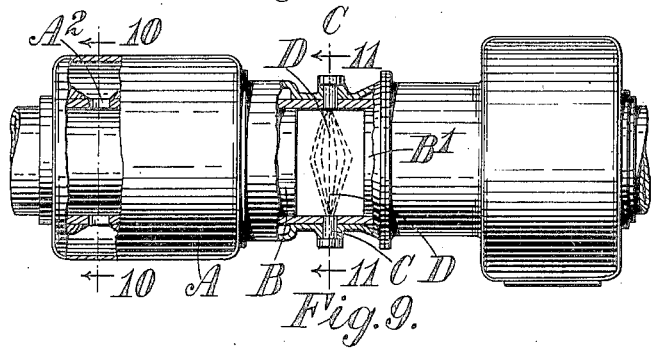 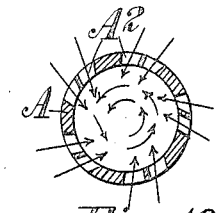
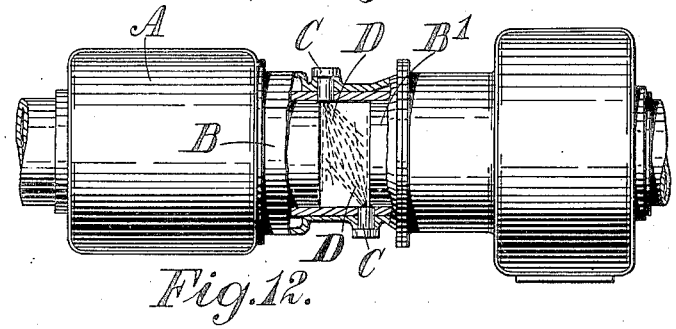 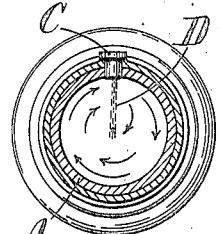
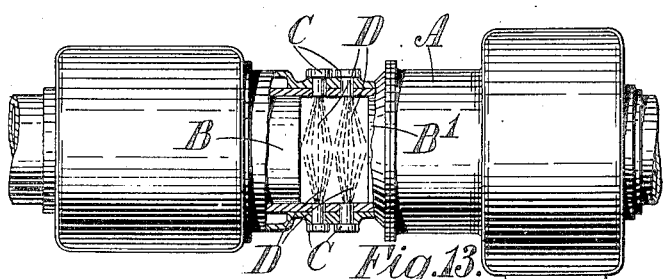 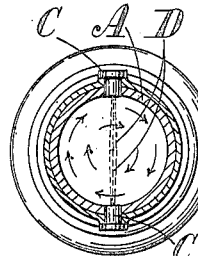
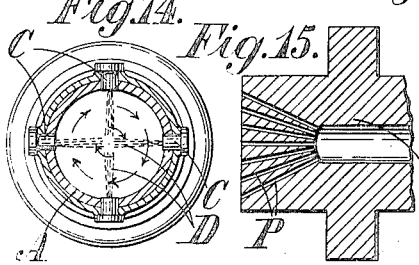 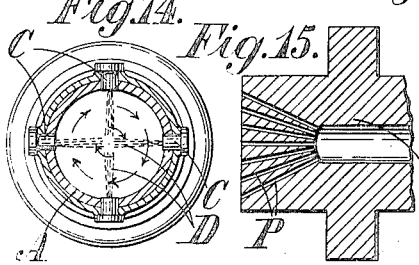 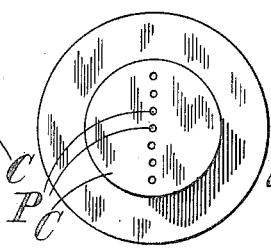

Patented Aug. 7, 1923.

1,464,268

UNITED STATES PATENT OFFICE.

KARL OTTO KELLER, OF SUNDERLAND, ENGLAND, ASSIGNOR OF ONE-HALF TO ROBERT PILE DOXFORD, OF SUNDERLAND, DURHAM, ENGLAND.

ENGINE OPERATED BY LIQUID FUEL AND METHOD OF WORKING THE SAME.

Application filed March 2, 1922. Serial No. 540,436.

*To all whom it may concern:*

Be it known that I, KARL OTTO KELLER, a citizen of the Swiss Confederation, residing at Sunderland, England, have invented certain new and useful Improvements in Engines Operated by Liquid Fuel and Methods of Working the Same, of which the following is a specification.

This invention relates to improvements in two-stroke or other engines operated by liquid fuel and in methods of working the same. A method of working two-stroke cycle internal-combustion engines is already known which consists in causing the scavenging air entering the cylinder of the engine to rotate within said cylinder and injecting liquid fuel into said rotating mass of air.

The present invention has for its object an improvement upon this method, in order to ensure an improved dispersal in the air filling the combustion-space, of the particles of fuel-oil injected into it, with a consequent improvement in combustion. The improvements constituting the present invention are applied to an engine which comprises the known combination with the cylinder of a scavenge-air inlet conduit (or a plurality of such conduits) which opens through the cylinder-wall and is, as to each said conduit, inclined out of a plane that contains the cylinder-axis. This arrangement has been and is employed in order that the entering scavenge-air stream shall exert a tangential rotative thrust on the body of air in the cylinder and thus impart to that body, as a whole, a whirling motion, either about the cylinder-axis or about one or another of the axes that are near to and more or less parallel therewith. During this whirling motion the body of air may be spinning as a cylindrical mass, or there may be a spiral progression of the air in it.

There is added to the combination aforesaid a spraying-device which must be of the kind that delivers a flat fan-shaped jet of fuel-oil spray, and it is one of the important characteristics of the present invention that this spraying-device must be so set in relation to the cylinder-wall that the issuing "fan" shall form a curtain extending through the whirling body of air in a special way, that is to say, not with its plane normal to the axis of the cylinder, but instead, lengthwise of the cylinder, and preferably coinciding with a plane containing the axis about which the aforesaid body of air whirls.

To spray a conical jet of fuel-oil into the side of a whirling body of air, set in motion by the scavenge-air is already known, and the present applicants do not desire to make any claim to this use of a conical jet, but they attach great importance to the use of a flat-sided fan-shaped jet when it forms a curtain across the whirling body of air that extends lengthwise of that body, that is to say, they consider it as being important for the purposes of the present invention to have a flat jet of oil so disposed as to form a curtain extending down through e. g. a cylindrical body of air, from one flat end to the other and from the circular circumference thereof towards or past the centre, so that, for instance, in a vertical engine the curtain would be a vertical curtain.

The above described relationship of the flat curtain to the whirling body of air is found to ensure a very complete impregnation of the body of air by the oil particles which become so thoroughly diffused in the body of air as it carries away the oil particles of the curtain in circular or spiral paths, first attenuating the curtain and finally causing it to disappear as such, that the combination according to this invention applied to a marine oil-engine has efficiently and satisfactorily burnt during a long trial, oil of the kind known as Mexican boiler-oil of a specific gravity (.945) higher than any which, to the best of the applicant's knowledge, information and belief, has ever before been satisfactorily usable in such engines. Not only has the use of the apparatus of this invention resulted in a high thermal efficiency of engine operation, but it has made possible the complete combustion in an engine of crude oils of a kind hitherto generally used only for burning in boiler-furnaces.

One embodiment of the invention and several modifications thereof are diagrammatically illustrated by way of example in the accompanying drawings. It is to be understood however, that the invention is not limited to the precise constructional details enumerated.

In these drawings:

Figures 1 and 2 are diagrammatic transverse section and longitudinal section, respectively, through the cylinder of an opposed-piston internal-combustion engine taken at the fuel-injection nozzle;

Figure 3 is a vertical sectional elevation showing the cylinder of a single-piston internal-combustion engine provided with fuel-injection nozzles set according to the invention, and Figure 4 is a horizontal section taken on the bent line 4—4 in Figure 3, showing the scavenge-air ports;

Figure 5 is a vertical sectional elevation showing the cylinder of a double-acting single-piston internal-combustion engine provided in the upper and lower combustion-spaces with fuel-injection nozzles set according to the invention;

Figure 6 is a longitudinal sectional elevation through the cylinder of an opposed-piston internal-combustion engine provided with one fuel-injection nozzle set according to the invention, and Figures 7 and 8 are transverse sections taken respectively on the lines 7—7 and 8—8 in Figure 6, respectively showing the scavenge-air ports and the arrangement of the fuel-injection nozzle;

Figure 9 is an elevation, partly broken away and in longitudinal section, showing the cylinder of an opposed-piston internal-combustion engine provided with two fuel-injection nozzles set diametrically opposite one another in a manner according to the invention, and Figures 10 and 11 are transverse sections taken respectively on the lines 10—10 and 11—11 in Figure 9 showing respectively a modified arrangement of scavenge-air ports, and the setting of the two nozzles;

Figures 12 and 13 are elevations, partly in longitudinal section, showing two further improved arrangements of fuel-injection nozzles in cylinders of opposed-piston internal-combustion engines, and Figure 14 is a transverse vertical section through an engine cylinder showing a further modified arrangement comprising four fuel-injection nozzles set according to the invention;

Figures 15 and 16 are longitudinal section, and end elevation, respectively, showing a known form of fuel-injection nozzle adapted for use in carrying into practice the method of working internal-combustion engines according to the invention.

Like reference letters designate like parts throughout the several views.

Figures 1 and 2 show how a jet D of spray entering near one end of and at one side of a combustion-space between opposed pistons B, B¹ is directed from a nozzle C towards the opposite side of a cylinder A, and the dotted line D¹ shows the general direction in which the air contents in the cylinder, whirling in the direction of the arrows D², take particles of oil out of the "curtain" jet D in attenuating the curtain as hereinbefore described.

Referring now to Figures 3 and 4, a water-jacketed cylinder A of an internal-combustion engine having a single piston B is provided with a lower set of scavenge-air ports A¹ and an upper set of scavenge-air ports A². As clearly shown in Figure 4, the lower ports A¹ are the ordinary radially-disposed ports, whilst the upper ports A² are angled, that is to say are directed out of a plane that contains the cylinder axis, in order that the entering scavenge-air stream may exert in the known manner a rotative thrust on the body of air in the cylinder for causing it to whirl therein about the cylinder axis or about one or another of the axes that are near that axis and parallel or substantially parallel therewith. The cylinder is provided near its head with two spraying devices C, C, each for delivering a flat fan-shaped jet D into the combustion chamber between the cylinder-head and the adjacent end of the piston B. As shown, these spraying devices are in the form of a fuel-injection nozzle of the known kind illustrated in Figures 15 and 16, comprising a number of radiating oil passages $p$ arranged in one plane. As shown in Figure 3, these nozzles are situated at opposite sides of the cylinder wall not coaxial with one another, but staggered so as to be one at the upper end of the chamber and the other at a lower level therein, and each is adapted to produce a flat fan-shaped jet of fuel-oil spray D situated in the central plane of the cylinder. According to this invention each of these nozzles C is so set in relation to the cylinder wall that a flat fan of spray is formed which constitutes a curtain that extends into the whirling body of air in the combustion chamber, lengthwise of that body.

In the engine shown in Figure 5, two fuel-injection nozzles C are arranged diametrically opposite one another and coaxial one with the other in the combustion-space below the piston B, whilst a single spraying device C¹ mounted in the cylinder-head coaxial with the axis of the cylinder A is provided in the combustion-space above the piston. This spraying device C¹ comprises two lateral nozzles directed away from one another towards diametrically opposite parts of the cylinder wall, and each of the nozzles in this engine is so set in relation to the cylinder wall that a curtain or flat fan of spray extends into a whirling body of air lengthwise of that body and in a plane coincident with the cylinder axis about which the body of air whirls. If desired a single spraying device C¹ for producing radial outwardly-directed curtains D of spray may be provided in the head of a single-piston engine, instead of the two nozzles C shown in Figure 3.

In the engine illustrated in Figures 6, 7 and 8, the curtain D of spray, produced by the nozzle C between the two opposed pistons, B, B¹, likewise extends into the whirling body of air in the combusion chamber lengthwise of that body, as distinct from normal to the axis of whirl of the air, and is shown in Figure 8 as extending coincident with a plane containing the cylinder axis about which the body of air whirls.

The construction of engine illustrated in Figures 9, 10 and 11 differs from that described with reference to Figure 6 in the arrangement of the scavenge-air ports A², which are spaced apart differently from those shown in Figure 7, and further in that two nozzles C are provided, situated diametrically opposite one another and co-axial with each other.

In the engine illustrated in Figure 12 two nozzles C are provided in staggered relation, one at each side of the combustion-space with their axes non-coaxial.

Figure 13 shows a modified construction in which two pairs of nozzles C are arranged at the two sides of the combustion-space, one nozzle of each pair being diametrically opposite and coaxial with a nozzle of the other pair.

Figure 14 shows a modified construction in which four nozzles C are disposed in one plane and angularly spaced therein 90° apart around the combustion-space, all of the nozzles being directed towards the center with the planes of the fans of spray produced by them meeting and intersecting on the line of the cylinder axis.

What I claim as my invention and desire to secure by Letters Patent is:—

1. In the method of working an internal-combustion engine, the steps consisting of causing a body of air to rotate in the cylinder during the compression stroke about an axis extending lengthwise of the cylinder, and injecting into the rotating body of air a flat fan-shaped jet of fuel-oil spray in such a manner that it forms a curtain which extends into said rotating body of air and has the plane of the curtain extending lengthwise of that body and substantially parallel to its axis of whirl.

2. In an internal-combustion engine, the combination with a cylinder and means for causing a body of air in the cylinder to whirl therein about an axis extending lengthwise of the cylinder, of an oil-spraying device for delivering a flat fanshaped jet of fuel-oil spray into the whirling body of air, which device is so set in relation to the cylinder wall that the flat fan forms a curtain extending into the said whirling body of air with the general plane of the curtain extending lengthwise of that body.

In testimony whereof I affix my signature.

KARL OTTO KELLER.